US012128439B1

(12) United States Patent
Xu

(10) Patent No.: US 12,128,439 B1
(45) Date of Patent: Oct. 29, 2024

(54) ADJUSTABLE PRESSURE CLEANING MACHINE

(71) Applicant: Ningbo Yinzhou Jiasheng Pump Electric Machinery Factory, Ningbo (CN)

(72) Inventor: Rongding Xu, Ningbo (CN)

(73) Assignee: Ningbo Yinzhou Jiasheng Pump Electric Machinery Factory, Ningbo (CN)

(*) Notice: Subject to any disclaimer, the term of this patent is extended or adjusted under 35 U.S.C. 154(b) by 0 days.

(21) Appl. No.: 18/398,555

(22) Filed: Dec. 28, 2023

(51) Int. Cl.
*B05B 9/04* (2006.01)

(52) U.S. Cl.
CPC .................................. *B05B 9/0403* (2013.01)

(58) Field of Classification Search
CPC ...... B05B 12/02; B05B 12/069; B05B 9/0403
USPC .................................................... 239/101, 99
See application file for complete search history.

(56) References Cited

U.S. PATENT DOCUMENTS 7,687,926 B2 * 3/2010 Grant ...................... F02B 63/04 290/1 A
9,878,341 B2 * 1/2018 Gilpatrick ............... F04B 49/03
10,130,962 B2 * 11/2018 Dey ........................ B05B 12/08
10,791,901 B2 * 10/2020 Moon .................. A47L 9/2842
11,000,168 B2 * 5/2021 Lee ...................... A47L 9/2842
11,135,621 B2 * 10/2021 Liu ........................ B08B 13/00
11,376,618 B2 * 7/2022 Bolea ...................... H04B 3/54
D1,017,156 S * 3/2024 Morand ......................... D32/21
2009/0269218 A1* 10/2009 Gardner .................. F04B 17/06 417/234
2010/0282586 A1* 11/2010 Chiu .................... B60Q 1/0076 200/6 A
2012/0006431 A1* 1/2012 Gilpatrick ............. B05B 1/1654 137/565.01
2013/0092745 A1* 4/2013 Karp ....................... B08B 3/026 239/70
2014/0131475 A1* 5/2014 Borinato .................. B05B 9/01 239/176
2015/0102121 A1* 4/2015 Dey .......................... B05B 9/01 239/69
2017/0239676 A1* 8/2017 Kristensen .............. B05B 12/00
2018/0029056 A1* 2/2018 Alexander ............ F02N 11/106
2019/0118203 A1* 4/2019 Fontaine ............... B05B 7/2475
2019/0388923 A1* 12/2019 Giacalone ............... B05B 12/00
2020/0023411 A1* 1/2020 Krajewski ............. F04B 53/002
2024/0261810 A1* 8/2024 Donaldson ............ B05B 7/1209

* cited by examiner

*Primary Examiner* — Joseph A Greenlund
(74) *Attorney, Agent, or Firm* — Birchwood IP

(57) ABSTRACT

Embodiments of the present disclosure discloses an adjustable pressure cleaning machine including a host machine and a water gun. The main machine is provided with a main control circuit board, the water gun is provided with a remote controller. The main control circuit board is connected to the remote controller through communication; an outer shell of the host machine is provided with a pressure gear button and a power source button, the remote controller is provided with a remote control gear button. The main control circuit board includes a power source module, a button control module, and a voltage control module; the power source module is connected to an external power source to provide working voltage to the button control module and voltage control module. An output end of the voltage control module is connected to a power input end of a motor of the cleaning machine.

9 Claims, 6 Drawing Sheets

ADJUSTABLE PRESSURE CLEANING MACHINE

TECHNICAL FIELD

The present disclosure relates to the field of pressure washer technologies, and in particular, to an adjustable pressure cleaning machine.

BACKGROUND

A high-pressure cleaning machine is a machine that uses a motor and other power devices to generate high-pressure water from a water pump to flush a surface of an object. It can peel off and wash away dirt, achieving a purpose of cleaning a surface of an object. Due to a use of high-pressure water columns to clean dirt, high-pressure cleaning is also recognized as one of the most economical and environmentally friendly cleaning methods. The requirements for an outlet pressure of high-pressure cleaning machines vary when cleaning different objects. For example, when cleaning the floor and swimming pool, a pressure of 10 Mpa is more suitable; when cleaning a car, a pressure of 80 Mpa is more suitable; when cleaning an air conditioning filter, a pressure of 60 Mpa is more suitable. However, the outlet pressure of traditional high-pressure cleaning machines is usually fixed and unchanged, which results in significant limitations in a use range thereof. If a cleaning machine with high water outlet pressure is used to clean an object with low pressure requirements, it is easy to cause damage to the object. However, if a cleaning machine with low water outlet pressure is used to clean the object with high pressure requirements, it is prone to clean them uncleanly and time-consuming.

SUMMARY

The present disclosure provides an adjustable pressure cleaning machine, which can adjust an output pressure of the cleaning machine and expand its use range.

In order to achieve the above objectives, an embodiment of the present disclosure provides a cleaning machine with adjustable pressure including a host machine and a water gun, the host machine is provided with a main control circuit board, the water gun is provided with a remote controller, the main control circuit board is connected to the remote controller through communication;

an outer shell of the host machine is provided with a pressure gear button and a power source button, the remote controller is provided with a remote control gear button; the main control circuit board includes a power source module, a button control module, and a voltage control module; the power source module is connected to an external power source to provide working voltage to the button control module and the voltage control module; an output end of the voltage control module is connected to a power input end of a motor of the cleaning machine; where the button control module is configured to drive the voltage control module to change the input voltage of the motor according to an operation instruction of the pressure gear button or the remote control gear button, thereby adjusting water outlet pressure of the water gun.

In an embodiment of the present disclosure, the water outlet pressure of the water gun has several levels, the pressure gear button includes a pressure increase button and a pressure decrease button; for each operation of the pressure increase button or the pressure decrease button, the button control module drives the voltage control module to correspondingly increase or decrease an input voltage of the motor based on the operation instruction of the pressure increase button or the pressure decrease button, thereby increasing or decreasing the water outlet pressure level of the water gun by one level accordingly.

In an embodiment of the present disclosure, the pressure gear button and the remote control gear button both include a maximum pressure gear button, a medium pressure gear button, and a minimum pressure gear button; the button control module drives the voltage control module to adjust the input voltage of the motor to a maximum voltage, a medium voltage, or a minimum voltage according to the operation instruction of the maximum pressure gear button, the medium pressure gear button, or the minimum pressure gear button so that the water outlet pressure of the water gun is adjusted to a maximum pressure level, a medium pressure level, and a minimum voltage level accordingly.

In an embodiment of the present disclosure, the power source module includes a variable resistor RV1, a capacitor CX1, a rectification and filter unit, a switching power supply AC-DC voltage reduction unit, a transformer T1, a capacitor CY1, and a DC-DC voltage reduction unit;

the rectification and filter unit includes a rectification bridge BD1, a capacitor C4, and an inductor L1; the switching power supply AC-DC voltage reduction unit includes a capacitor C2, a capacitor C3, a resistor R6, a diode D1, a first chip U1, a resistor R1, a capacitor C11, a capacitor C10, a resistor R10, a capacitor C6, and a diode D2; the DC-DC voltage reduction unit includes a diode D5, a capacitor C5, a capacitor C9, a resistor R12, a second chip U2, and a capacitor C12;

the variable resistor RV1 and the capacitor CX1 are both connected in parallel between a first input end and a second input end of the rectifier bridge BD1; the first input end and the second input end of the rectifier bridge BD1 are respectively connected to a positive electrode and a negative electrode of the external power supply; the capacitor C4 is connected in parallel between a first output end and a second output end of the rectifier bridge BD1; an end of the inductor L1 is connected to the first output end of the rectifier bridge BD1, the other end of the inductor L1, an end of the capacitor C2, two ends of the resistor R6, two ends of the capacitor C3, a negative electrode of the diode D1, an end of the resistor R1, and an end of the capacitor CY1 are all connected to a first input end of transformer T1; the second output end of rectifier bridge BD1, the other end of the capacitor C2 and a fifth pin of the first chip U1 are all grounded; a positive electrode of the diode D1 and an eighth pin of the first chip U1 are both connected to a second input end of the transformer T1; the other end of the resistor R1 is connected to a first pin of the first chip U1, the first pin of the first chip U1 is grounded through the capacitor C11; a third pin of the first chip U1 is grounded through the capacitor C6; a fourth pin of the first chip U1 is grounded through the capacitor C10; two ends of the resistor R10 are connected in parallel with two ends of the capacitor C10, a negative electrode of the diode D2 is connected to the third pin of the first chip U1, a positive electrode of the diode D2 is connected to a fourth input end of the transformer T1, a third input end of the transformer T1 is grounded, the other end of the capacitor CY1 is connected to a first output end of the transformer T1, a positive electrode of the diode D5 is connected to a second output end of the transformer T1; a negative electrode of the diode D5 is connected to an end of the capacitor C5, an end of the capacitor C9, a CON pin of the second chip U2, an end of the capacitor C12, and a connection node is an output end of the power source module; the other end of the capacitor C5, the other end of the capacitor C9, and an end of the resistor R12 are all connected to the first output end of the transformer T1; the other end of the resistor R12 is connected to a Vin pin of the second chip U2, an Out pin of the second chip U2 and the other end of the capacitor C12 are both grounded.

In an embodiment of the present disclosure, the button control module includes a third chip U30, the capacitor C5, a resistor R18, a resistor R19, a resistor R21, a resistor R22, a resistor R23, and a resistor R24;

a fifteenth pin of the third chip U30 is connected to the power source button through the resistor R23, a third pin of the third chip U30 is connected to the pressure increase button through the resistor R19, a first pin of the third chip U30 is connected to the pressure decrease button through the resistor R21, a second pin of the third chip U30 is connected to the maximum pressure gear button through the resistor R24, a sixteenth pin of the third chip U30 is connected to the medium pressure gear button through the resistor R22, a fourth pin of the third chip U30 is connected to the minimum pressure gear button through the resistor R18, the capacitor C16 is connected between a twenty fourth and twenty first pins of the third chip U30, the twenty fourth pin of the third chip U30 is connected to the output end of the power source module, the twenty first pin of the third chip U30 is grounded.

In an embodiment of the present disclosure, the main control circuit board further includes a drive signal output module, the button control module is connected to the voltage control module through the drive signal output module;

the drive signal output module includes a second wiring interface J2, a resistor R16, a resistor R17, a capacitor C21, a capacitor C22, a capacitor C23, a capacitor C24, and an inductor L2;

a fifth pin of the second wiring interface J2 is connected to a nineteenth pin of the third chip U30 through the resistor R16; an end of the resistor R17 is connected to the nineteenth pin of the third chip U30, the other end thereof is connected to the output end of the power source module; two ends of the capacitor C23 and the capacitor C24 are connected in parallel between a fourth pin and a third pin of the second wiring interface J2; an end of the inductor L2 is connected to a fourth pin of the second wiring interface J2; the other end of the inductor L2, an end of the capacitor C21 and an end of the capacitor C22 are all connected to the output end of the power source module; a third pin of the second wiring interface J2, the other end of the capacitor C21 and the other end of the capacitor C22 are all grounded, a second pin of the second wiring interface J2 is connected to a twenty sixth pin of the third chip U30.

In an embodiment of the present disclosure, the main control circuit board further includes a zero-crossing detection module;

the voltage control module includes a bidirectional thyristor M1, a capacitor C1, a capacitor C7, a resistor R13, a resistor R5, a resistor R9, a resistor R3, a first optocoupler U5, a resistor R11, a resistor R20, a MOS transistor FET1, a capacitor C14, a transistor Q1, a resistor R7, a resistor R8, a capacitor C13, and a first wiring interface J1;

the output end of the voltage control module is connected to a positive electrode power input end of the motor; an end of the capacitor C1 is connected to an end of the capacitor C7 and a first end of the bidirectional thyristor M1, and a connection node is the output end of the voltage control module; the other end of the capacitor C1 is connected to an end of the resistor R13; the other end of the resistor R13, a second end of the bidirectional thyristor M1, an end of the resistor R5, and an end of the resistor R3 are all connected to a positive electrode of the external power supply, the other end of the resistor R3 is connected to the zero-crossing detection module, the zero-crossing detection module is further connected to a first pin of the first wiring interface J1; the other end of the capacitor C7 is connected to the other end of the resistor R5 and an end of the resistor R9; an end of the resistor R9 is connected to a third pin of the first optocoupler U5; a fourth pin of the first optocoupler U5 is connected to a controlled end of the bidirectional thyristor M1; a first pin of the first optocoupler U5 is connected to a collector of a transistor Q1 through the resistor R11; a second pin of the first optocoupler U5 is connected to a drain of the MOS transistor FET1; a gate of the MOS transistor FET1 is connected to the output end of the power source module through the resistor R20; an end of the capacitor C14 is connected to the gate of the MOS transistor FET1, the other end of the capacitor C14 and a source of the MOS transistor FET1 are both grounded; a base of the transistor Q1 is connected to an emitter through the resistor R7, an end of the resistor R8 is connected to the base of the transistor Q1; the other end of the resistor R8 and an end of the capacitor C13 are connected to a fourth pin of the first wiring interface J1; the other end of the capacitor C13 is connected to the output end of the power source module, a second pin of the first wiring interface J1 is connected to the output end of the power source module, a third pin of the first wiring interface J1 is grounded, and the first pin of the first wiring interface J1 is connected to the zero-crossing detection module.

In an embodiment of the present disclosure, the zero-crossing detection module includes a second optocoupler U3, a third optocoupler U4, a resistor R2, and a resistor R4;

a first pin of the second optocoupler U3, a second pin of the third optocoupler U4, and a negative electrode power input end of the motor are all connected to the negative electrode of the external power supply; a second pin of the second optocoupler U3 and a first pin of the third optocoupler U4 are both connected to the other end of the resistor R3; a fourth pin of the second optocoupler U3, a fourth pin of the third optocoupler U4, an end of the resistor R4, an end of the resistor R2, and the other end of the resistor R2 are connected to the output end of the power source module; a third pin of the second optocoupler U3 and a third pin of the third optocoupler U4 are both grounded, the other end of the resistor R4 is connected to the first pin of the first wiring interface J1;

the first wiring interface J1 is connected to the second wiring interface J2 to achieve a connection of the voltage control module and the button control module; the first pin of the first wiring interface J1 is connected to a fifth pin of the second wiring interface J2, the second pin of the first wiring interface J1 is connected to the fourth pin of the second wiring interface J2, the third pin of the first wiring interface J1 is connected to the third pin of the second wiring interface J2, the fourth pin of the first wiring interface J1 is connected to the second pin of the second wiring interface J2, a fifth pin of the first wiring interface J1 is connected to a first pin of the second wiring interface J2.

In an embodiment of the present disclosure, the main control circuit board further includes a fan drive module and a temperature detection module;

the fan drive module includes a fan interface JK1, a diode D3, a fuse F2, a resistor R14, a resistor R15, and a transistor Q3; the first pin of the second wiring interface J2 is connected to a twenty seventh pin of the third chip U30; a second pin of the fan interface JK1, a positive electrode of the diode D3, and an end of the capacitor C15 are all grounded; a first pin of the fan interface JK1 and a negative electrode of the diode D3 are both connected to a collector of the transistor Q3, the other end of the capacitor C15, an end of the fuse F2, and an end of the resistor R14 are all connected to the output end of the power source module; the other end of the resistor R14 and an end of the resistor R15 are both connected to a base of the transistor Q3, the other end of the fuse F2 is connected to an emitter of the transistor Q3, the other end of the resistor R15 is connected to the fifth pin of the first wiring interface J1;

the temperature detection module includes a temperature sensor interface JK2, a resistor R25, a resistor R26, and a capacitor C25; an end of the resistor R25 and an end of the resistor R26 are both connected to a first pin of the temperature sensor interface JK2, the other end of the resistor R25 is connected to the output end of the power source module, the other end of the resistor R26 and an end of the capacitor C25 are both connected to an eighteenth pin of the third chip U30, the other end of the capacitor C25 and a second pin of the temperature sensor interface JK2 are both grounded.

In an embodiment of the present disclosure, the main control circuit board further includes a buzzer module;

the buzzer module includes a buzzer BZ1, a resistor R27, a resistor R28, a resistor R29, and a transistor Q2; a base of the transistor Q2 is connected to a twenty second pin of the third chip U30 through the resistor R29; an end of the resistor R28 is connected to a base of the transistor Q2, the other end thereof and an emitter of the transistor Q2 are grounded, a collector of the transistor Q2 and an end of the resistor R27 are connected to an end of the buzzer BZ1, the other end of the resistor R27 and the other end of the buzzer BZ1 are both connected to the output end of the power source module; where the buzzer produces a prompt sound when the power source button, the pressure gear button and remote control gear button are operated;

the outer shell is further provided with a power indicator light, a button indicator light, and a pressure gear indicator light connected to the button control module.

Beneficial effect: an adjustable pressure cleaning machine according to the present disclosure including a host machine and a water gun. The host machine is provided with a main control circuit board, the water gun is provided with a remote controller. The main control circuit board is connected to the remote controller through communication; an outer shell of the host machine is provided with a pressure gear button and a power source button, the remote controller is provided with a remote control gear button. The main control circuit board includes a power source module, a button control module, and a voltage control module; the power source module is connected to an external power source to provide working voltage to the button control module and the voltage control module. An output end of the voltage control module is connected to a power input end of a motor of the cleaning machine. The button control module is configured to drive the voltage control module to change an input voltage of the motor according to an operation instruction of the pressure gear button or the remote-control gear button. By changing the input voltage of the motor, a speed of the motor can be changed, and the speed of the motor determines water outlet pressure of the water gun. The faster the motor speed, the greater the water outlet pressure of the water gun, and vice versa. This achieves an adjustment of the water outlet pressure of the water gun, allowing the cleaning machine to use different water outlet pressures according to different objects and expand its use range.

BRIEF DESCRIPTION OF DRAWINGS

Based on the drawings, a detailed description of specific implementation modes of the present disclosure will make the technical solution and beneficial effects of the present disclosure obvious.

DESCRIPTION OF EMBODIMENTS

Please refer to the drawings, where the same component symbol represents the same component. The principle of the present disclosure is illustrated by implementing it in an appropriate computing environment. The following explanation is based on the specific embodiments of the present disclosure illustrated, and should not be regarded as limiting other specific embodiments of the present disclosure that are not detailed here.

Referring to FIGS. 1 to 4, an adjustable pressure cleaning machine provided in an embodiment of the present disclosure includes a host machine 10 and a water gun 20, the host machine 10 is provided with a water pump and a motor that drives the water pump to discharge water, and the water gun 20 is connected to the water pump through a water pipe.

The host machine 10 is provided with a main control circuit board 30, the water gun 20 is provided with a remote controller 40. The main control circuit board 30 is connected to the remote controller 40 through communication. The remote controller 40 can be provided with an infrared transmitter, and the main control circuit board 30 is provided with an infrared receiver. The remote controller 40 sends an infrared signal through the infrared transmitter, and the main control circuit board 30 receives the infrared signal from the remote controller 40 through the infrared receiver.

Figure 1:
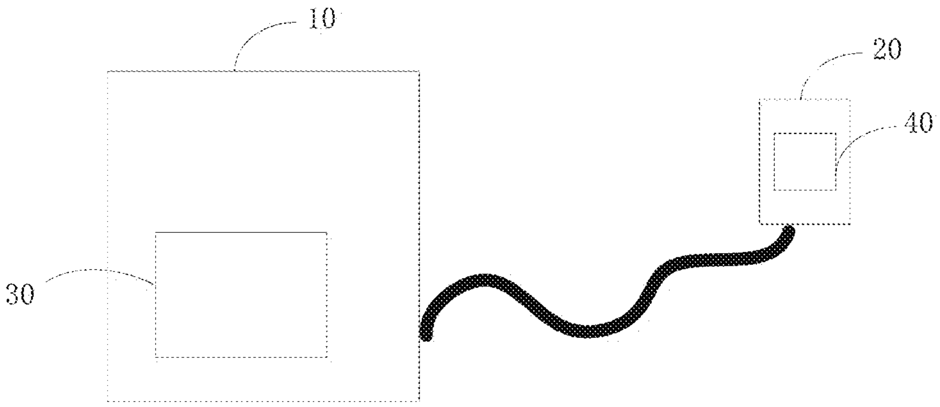
FIG. 1 is a schematic diagram of a structure of an adjustable pressure cleaning machine in the present disclosure.
Figure 2:
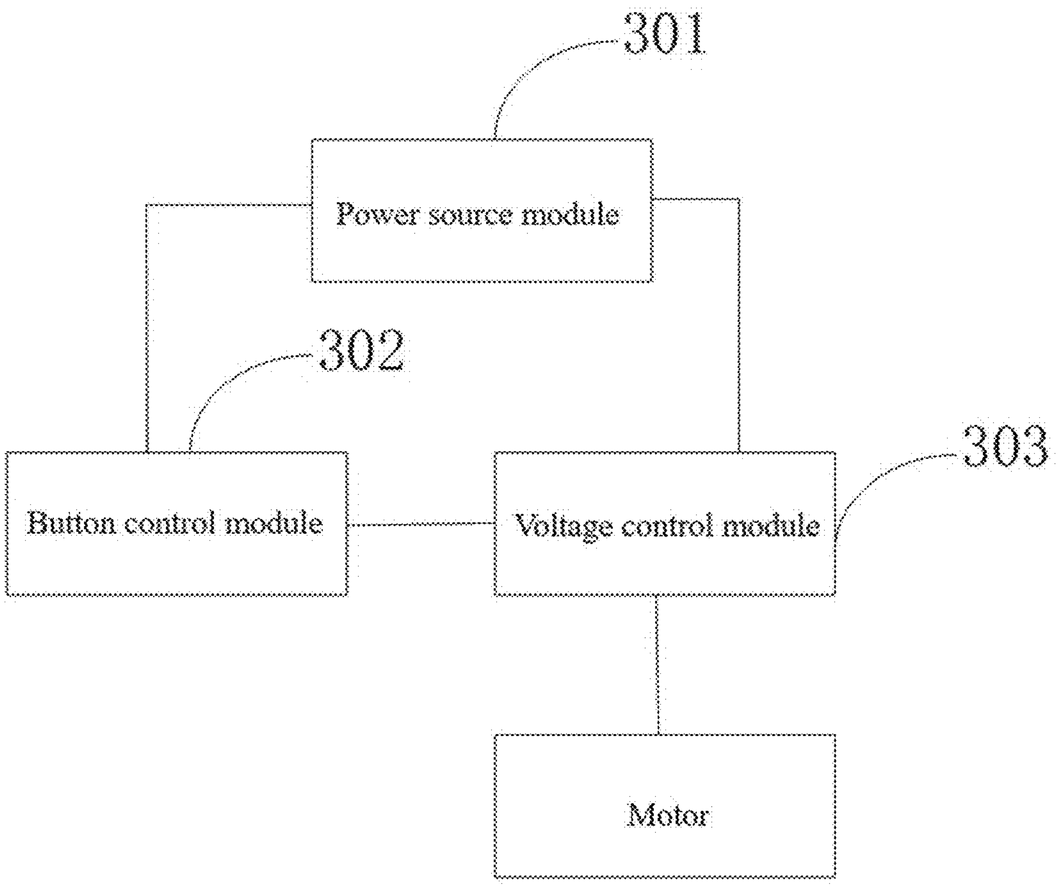
FIG. 2 is a schematic diagram of a structure of a main control circuit board of the present disclosure.

An outer shell 101 of the host machine 10 is provided with a pressure gear button and a power source button A11, and the remote control 40 is provided with a remote control gear button. As shown in FIG. 2, the main control circuit board 30 includes a power source module 301, a button control module 302, and a voltage control module 303; the power source module 301 is connected to an external power source to provide working voltage to the button control module 302 and the voltage control module 303. An output end of the voltage control module 303 is connected to a power input end of a motor of the cleaning machine. The button control module 302 is configured to drive the voltage control module 303 to change the input voltage of the motor according to an operation instruction of the pressure gear button or the remote control gear button, thereby adjusting water outlet pressure of the water gun 20. Therefore, by changing an input voltage of the motor, a speed of the motor can be changed, and a speed of the motor determines the water output of the water pump, which in turn determines an outlet pressure of the water gun 20. The faster the motor speed, the greater the outlet pressure of the water gun 20, and vice versa, thereby achieving an adjustment of the outlet pressure of the water gun 20. This allows the cleaning machine to use different outlet pressures according to different objects, expanding its use range.

It can be understood that the power module 301 is a rechargeable battery, the button control module 302 is a keyboard pressing plate, which is composed of rubber buttons, a keyboard control circuit board, and a button chip. The voltage control module 303 is a voltage control circuit.

Figure 3:
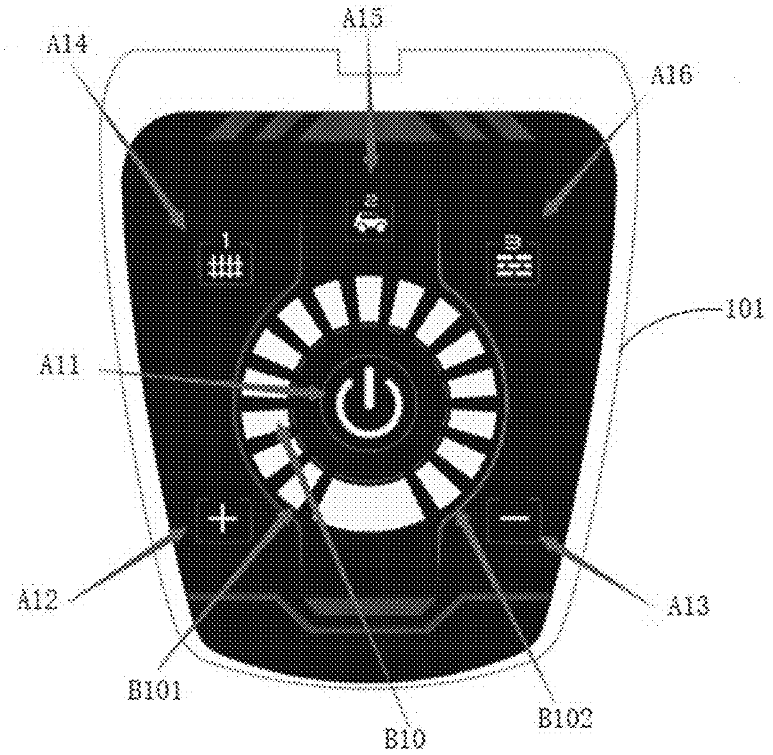
FIG. 3 is a schematic diagram of a structure of buttons on the main control circuit board of the present disclosure.

In an exemplary implementation mode of the present disclosure, the water outlet pressure of the water gun 20 has several levels, such as 15 levels, as shown in FIG. 3. Correspondingly, 15 levels display B10 are set on the shell 101, including a minimum pressure level display B101 and a maximum pressure level display B102. The pressure gear button includes a pressure increase button A12 and a pressure decrease button A13. For each operation of the pressure increase button A12 or the pressure decrease button A13, the button control module 302 drives the voltage control module 303 to correspondingly increase or decrease the input voltage of the motor according to the operation instruction of the pressure increase button A12 or the pressure decrease button A13, thereby increasing or decreasing the outlet pressure level of the water gun 20 accordingly.

Figure 4:
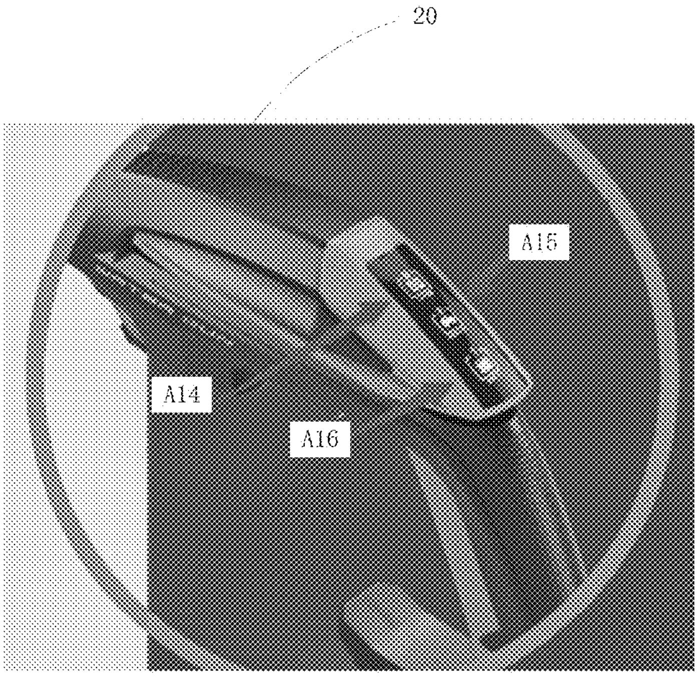
FIG. 4 is a schematic diagram of a structure of button on a water gun of the present disclosure.

In an implementation mode, the pressure gear button can further include a minimum pressure gear button A14, a medium pressure gear button A15, and a maximum pressure gear button A16. As shown in FIG. 4, the remote-control gear button on the remote controller 20 can also include the minimum pressure gear button A14, the medium pressure gear button A15, and the maximum pressure gear button A16. Of course, in other embodiments, the remote control gear button on the remote controller 20 can also be set as a pressure increase button and a pressure decrease button, or include the maximum pressure gear button, medium pressure gear button, minimum pressure gear button, pressure increase button, and pressure decrease button, without limitation. It can be understood that the minimum pressure gear button A14, medium pressure gear button A15, and maximum pressure gear button A16 are quick buttons that can quickly adjust the water outlet pressure level to the maximum pressure level, medium pressure level, and minimum pressure level. The button control module 302 drives the voltage control module 303 to adjust the input voltage of the motor to a maximum voltage, a medium voltage, or a minimum voltage according to the operation instruction of the maximum voltage gear button A14, medium voltage gear button A15, or minimum voltage gear button A16, so that the water outlet pressure of the water gun 20 can be adjusted to the maximum pressure level, medium pressure level, and minimum pressure level accordingly.

For example, a rated maximum outlet pressure of the cleaning machine is 10 Mpa, the minimum outlet pressure is 6 Mpa, and there are 15 levels between the maximum outlet pressure and the minimum outlet pressure, a pressure difference between each level is about 2.6 bar. The minimum pressure is set to 6 Mpa, the middle pressure is 8 Mpa, and the maximum pressure is 10 Mpa. Therefore, by operating the pressure increase button A12 or the pressure decrease button A13 once, the outlet pressure will correspondingly increase or decrease by 2.6 bar. If the maximum pressure gear button A16 is operated, the water outlet pressure is 10 Mpa, and if the minimum pressure gear button A14 is operated, the water outlet pressure is 6 Mpa.

Where, the power source button A11, the pressure increase button A12, the pressure decrease button A13, the minimum voltage gear button A14, the medium voltage gear button A15, and the maximum voltage gear button A16 can be touch buttons or physical buttons, and the operation of these buttons can be touch or press operations accordingly. This embodiment takes the touch button as an example, and each button is a touch button. The outer shell 101 is further provided with a power indicator light, a button indicator light, and a pressure gear indicator light connected to the button control module 302. The power indicator light is located at the power source button A1 and is configured to light up the power source button A11 when it is touched or pressed. The button indicator light includes five indicator lights located at the pressure increase button A12, the pressure decrease button A13, the minimum pressure gear button A14, the medium pressure gear button A15, and the maximum pressure gear button A16, respectively. It is used to light up a corresponding button when each button is touched. The number of pressure gear indicator lights is the same as the number of water outlet pressure gears. If there are 15, they are used to light up the display of B10 for each of the 15 gears.

Figure 5:
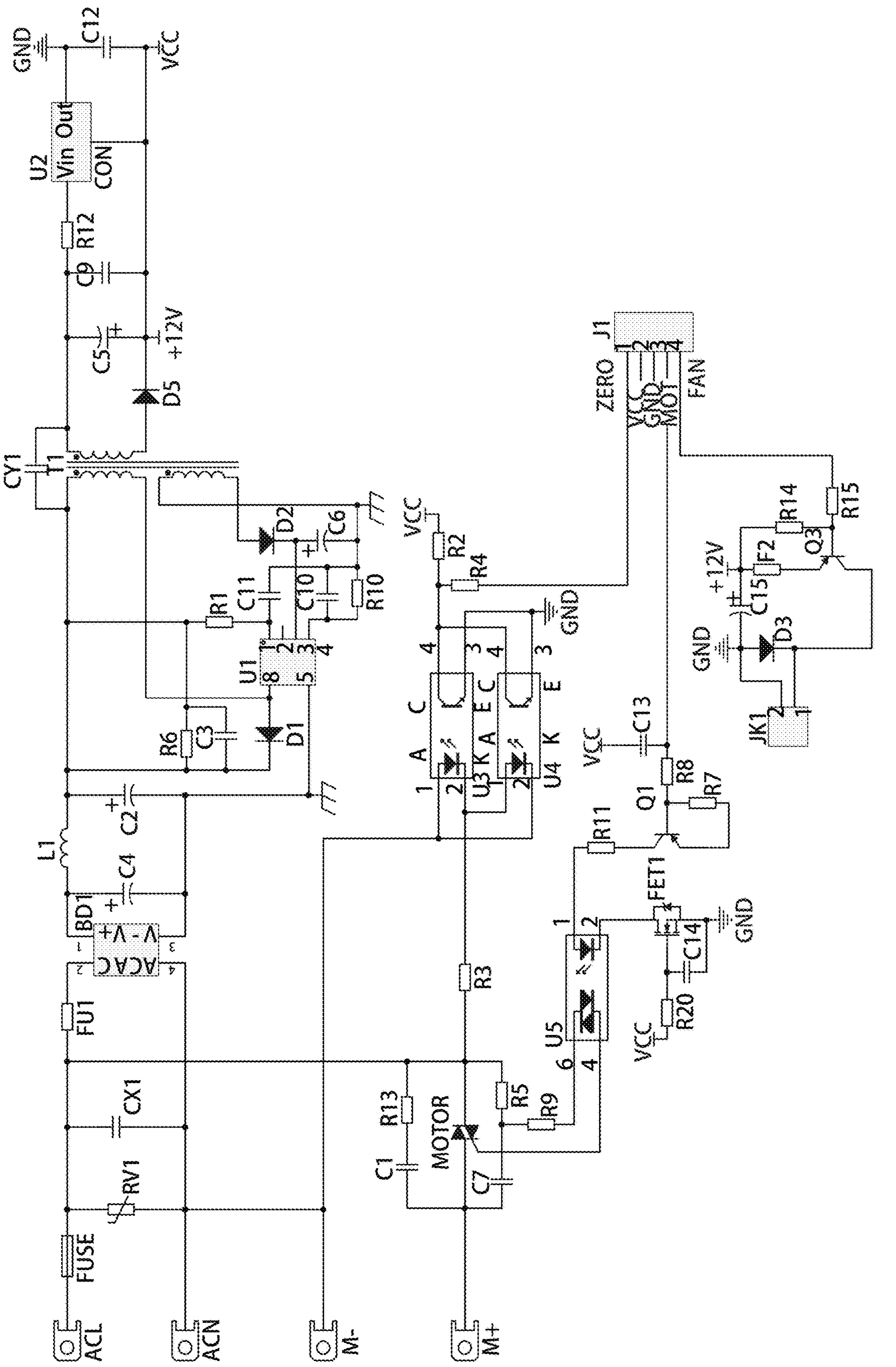
FIG. 5 is a circuit schematic diagram of a power source module, a voltage control module, a zero-crossing detection module, and a fan drive module on the main control circuit board of the present disclosure.

Referring to FIG. 5, the power source module 301 includes a variable resistor RV1, a capacitor CX1, a rectification and filter unit, a switching power supply AC-DC voltage reduction unit, a transformer T1, a capacitor CY1, and a DC-DC voltage reduction unit.

The rectification and filter unit includes a rectification bridge BD1, a capacitor C4, and an inductor L1; the switching power supply AC-DC voltage reduction unit includes a capacitor C2, a capacitor C3, a resistor R6, a diode D1, a first chip U1, a resistor R1, a capacitor C11, a capacitor C10, a resistor R10, a capacitor C6, and a diode D2; the DC-DC voltage reduction unit includes a diode D5, a capacitor C5, a capacitor C9, a resistor R12, a second chip U2, and a capacitor C12.

The variable resistor RV1 and the capacitor CX1 are both connected in parallel between a first input end and a second input end of a rectifier bridge BD1. The first input end and the second input end of the rectifier bridge BD1 are respectively connected to a positive electrode ACL (live wire) and a negative electrode CAN (zero wire) of an external power source. The external power source can be a mains power source, for example. The capacitor C4 is connected in parallel between a first output end and a second output end of rectifier bridge BD1. An end of the inductor L1 is connected to the first output end of rectifier bridge BD1. The other end of the inductor L1, an end of the capacitor C2, two ends of the resistor R6, two ends of the capacitor C3, a negative electrode of the diode D1, an end of the resistor R1, and an end of the capacitor CY1 are all connected to a first input end of the transformer T1. The second output end of rectifier bridge BD1, the other end of the capacitor C2 and a fifth pin of the first chip U1 are both grounded. A positive electrode of the diode D1 and an eighth pin of the first chip U1 are both connected to a second input end of the transformer T1. The other end of the resistor R1 is connected to a first pin of the first chip U1. The first pin of the first chip U1 is grounded through the capacitor C11, a third pin of the first chip U1 is grounded through the capacitor C6, a fourth pin of the first chip U1 is grounded through the capacitor C10, two ends of the resistor R10 are connected in parallel with two ends of the capacitor C10. A negative electrode of the diode D2 is connected to the third pin of the first chip U1. A positive electrode of the diode D2 is connected to a fourth input end of the transformer T1. A third input end of the transformer T1 is grounded. The other end of the capacitor CY1 is connected to a first output end of the transformer T1. A positive electrode of the diode D5 is connected to a second output end of the transformer T1. A negative electrode of the diode D5 is connected to an end of the capacitor C5, an end of the capacitor C9, a CON pin of the second chip U2, an end of the capacitor C12, and a connection node is an output end of the power source module 301, which is configured to output the working voltage VCC. The other end of the capacitor C5, the other end of the capacitor C9, and an end of the resistor R12 are all connected to the first output end of the transformer T1. The other end of the resistor R12 is connected to a Vin pin of the second chip U2, an Out pin of the second chip U2 and the other end of the capacitor C12 are grounded.

Figure 6:
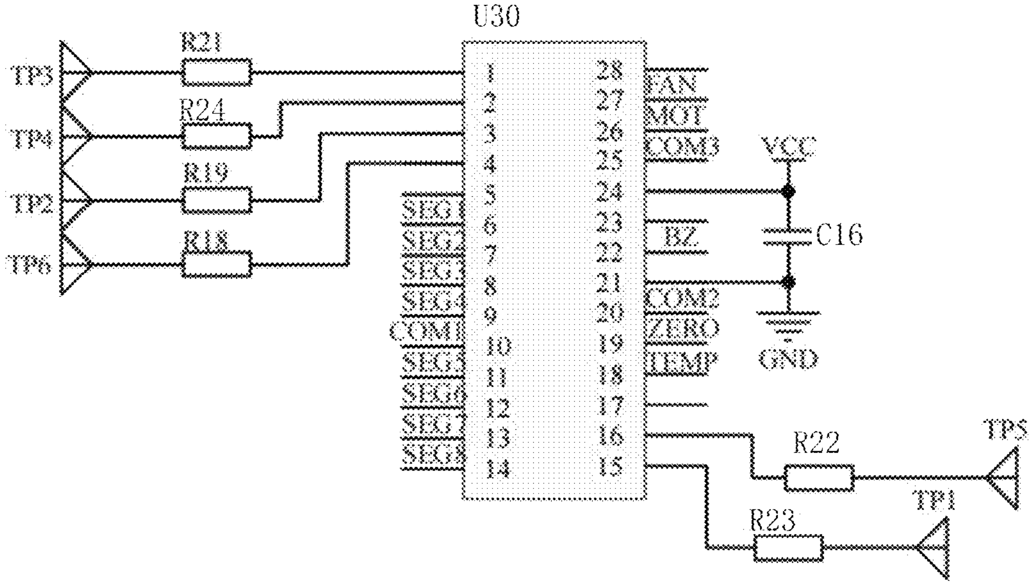
FIG. 6 is a circuit schematic diagram of a button control module on the main control circuit board of the present disclosure.

As shown in FIG. 6, the button control module 302 includes a third chip U30, the capacitor C16, a resistor R18, a resistor R19, a resistor R21, a resistor R22, a resistor R23, and a resistor R24.

A fifteenth pin of the third chip U30 is connected to the power source button A1 through the resistor R23, a third pin of the third chip U30 is connected to the pressure increase button A12 through the resistor R19, a first pin of the third chip U30 is connected to the pressure decrease button A13 through the resistor R21, a second pin of the third chip U30 is connected to the maximum voltage gear button A16 through the resistor R24, a sixteenth pin of the third chip U30 is connected to the medium voltage gear button A15 through a resistor R22, a fourth pin of the third chip U30 is connected to the minimum pressure gear button A14 through the resistor R18, the capacitor C16 is connected between a twenty fourth and tweeny first pins of the third chip U30, the twenty fourth pin of the third chip U30 is connected to the output end of the power source module 301, and the twenty first pin of the third chip U30 is grounded.

Figure 7:
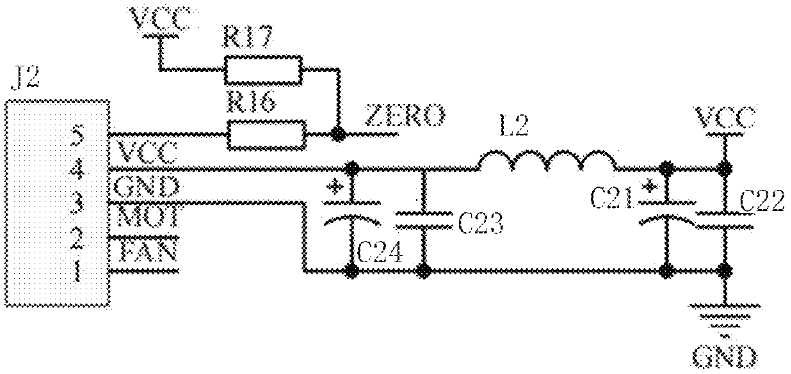
FIG. 7 is a circuit schematic diagram of a drive signal output module on the main control circuit board of the present disclosure.

As shown in FIG. 7, the main control circuit board 30 further includes a drive signal output module, the button control module 302 is connected to the voltage control module 303 through the drive signal output module.

The drive signal output module includes a second wiring interface J2, a resistor R16, a resistor R17, a capacitor C21, a capacitor C22, a capacitor C23, a capacitor C24, and an inductor L2.

A fifth pin of the second wiring interface J2 is connected to a ninetieth pin of the third chip U30 through the resistor R16. An end of the resistor R17 is connected to the nineteenth pin of the third chip U30, the other end thereof is connected to the output end of the power source module; two ends of the capacitor C23 and the capacitor C24 are connected in parallel between a fourth pin and a third pin of the second wiring interface J2. An end of inductor L2 is connected to a fourth pin of the second line interface J2, the other end of the inductor L2, an end of the capacitor C21 and an end of the capacitor C22 are all connected to the output end of the power source module. A third pin of the second wiring interface J2, the other end of the capacitor C21 and the other end of the capacitor C22 are all grounded, a second pin of the second wiring interface J2 is connected to a twenty sixth pin of the third chip U30.

Continuing to refer to FIG. 5, the main control circuit board 30 further includes a zero-crossing detection module.

The voltage control module 303 includes a bidirectional thyristor M1, a capacitor C1, a capacitor C7, a resistor R13, a resistor R5, a resistor R9, a resistor R3, a first optocoupler U5, a resistor R11, a resistor R20, a MOS transistor FET1, a capacitor C14, a transistor Q1, a resistor R7, a resistor R8, a capacitor C13, and a first wiring interface J1.

The output end of the voltage control module 303 is connected to a positive electrode power input end M+ of the motor. An end of the capacitor C1 is connected to an end of the capacitor C7 and a first end of the bidirectional thyristor M1, and a connection node is the output end of the voltage control module 303. The other end of the capacitor C1 is connected to an end of the resistor R13, and the other end of the resistor R13, a second end of the bidirectional thyristor M1, an end of the resistor R5, and an end of the resistor R3 are all connected to a positive electrode of the external power supply, the other end of the resistor R3 is connected to the zero-crossing detection module. The zero-crossing detection module is further connected to a first pin of the first wiring interface J1. The other end of the capacitor C7 is connected to the other end of the resistor R5 and an end of the resistor R9. An end of the resistor R9 is connected to a third pin of the first optocoupler U5, a fourth pin of the first optocoupler U5 is connected to a controlled end of bidirectional thyristor M1, a first pin of the first optocoupler U5 is connected to a collector of a transistor Q1 through the resistor R11, a second pin of the first optocoupler U5 is connected to a drain of the MOS transistor FET1, a gate of the MOS transistor FET1 is connected to an output end of power source module 301 through the resistor R20. An end of the capacitor C14 is connected to the gate of the MOS transistor FET1, the other end of the capacitor C14 and a source of the MOS transistor FET1 are both grounded, a base of the transistor Q1 is connected to an emitter through the resistor R7, an end of the resistor R8 is connected to the base of the transistor Q1, the other end of the resistor R8 and an end of the capacitor C13 are connected to a fourth pin of the first wiring interface J1. The other end of the capacitor C13 is connected to the output end of the power source module, a second pin of the first wiring interface J1 is connected to the output end of the power source module, a third pin of the first wiring interface J1 is grounded, and the first pin of the first wiring interface J1 is connected to the zero-crossing detection module.

The zero-crossing detection module includes a second optocoupler U3, a third optocoupler U4, a resistor R2, and a resistor R4. A first pin of the second optocoupler U3, a second pin of the third optocoupler U4, and as a negative electrode power input end M of the motor are all connected to the negative electrode of the external power supply. A second pin of the second optocoupler U3 and a first pin of the third optocoupler U4 are both connected to the other end of the resistor R3. A fourth pin of the second optocoupler U3, a fourth pin of the third optocoupler U4, and end of the resistor R4, an end of the resistor R2, and the other end of the resistor R2 are connected to the output end of the power source module, a third pin of the second optocoupler U3 and a third optocoupler U4 are both grounded, the other end of the resistor R4 is connected to the first pin of the first wiring interface J1.

The first wiring interface J1 is connected to the second wiring interface to achieve a connection between the voltage control module 303 and the button control module 302. The first pin of the first wiring interface J1 is connected to a fifth pin of the second wiring interface J2, the second pin of the first wiring interface J1 is connected to the fourth pin of the second wiring interface J2, the third pin of the first wiring interface J1 is connected to the third pin of the second wiring interface J2, the fourth pin of the first wiring interface J1 is connected to the second pin of the second wiring interface J2, a fifth pin of the first wiring interface J1 is connected to a first pin of the second wiring interface J2.

In an exemplary implementation mode of the present disclosure, a third chip U30 of the button detection module 302 detects whether each button is touched, in order to obtain an operation instruction of the touched button. By operating any of the pressure increase button A12, pressure decrease button A13, minimum pressure gear button A14, medium pressure gear button A15, and maximum pressure gear button A16, the water outlet pressure of the water gun 20 can be adjusted, the third chip U30 outputs different drive signals to the control end of the bidirectional thyristor M1 through a twenty sixth pin based on the operation of different buttons (such as the pressure increase button A12 and the pressure decrease button A13) or multiple operations of the same button (such as the pressure increase button A12). Different drive signals, such as signals with different duty cycles, are used to control the bidirectional thyristor M1 to change a phase angle, by changing an input voltage of the positive electrode power input end M+ of the motor, the motor speed can be changed, thereby achieving a purpose of changing an outlet pressure of the water gun 20.

In addition, an embodiment of the present disclosure can adjust the water outlet pressure level through the pressure gear button on the shell 101, or through the remote controller on the water gun 20. The remote controller is provided with a remote control gear button, which includes the minimum pressure gear button A14, medium pressure gear button A15, and maximum pressure gear button. When one of the gear buttons on the remote controller is touched or pressed, the remote control sends an infrared remote control signal to the button control module 302. The button control module 302 receives the remote control signal to determine an operation of the maximum, medium, and minimum gear buttons, and then provides corresponding drive signals to the bidirectional thyristor M1 to change the phase angle of the bidirectional thyristor M1, thereby changing an input voltage of the motor, and adjusting the outlet pressure of the water gun 20 to the corresponding gear.

Figure 8:
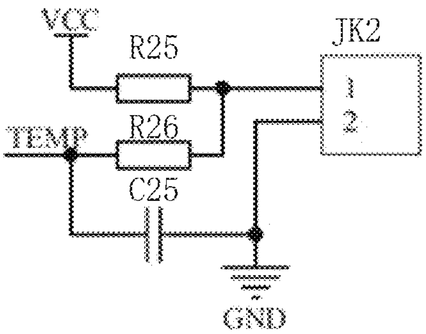
FIG. 8 is a circuit schematic diagram of a temperature detection module on the main control circuit board of the present disclosure.

Continuing to refer to FIG. 5 and in combination with FIG. 8, the main control circuit board 30 further includes a fan drive module and a temperature detection module.

The fan drive module includes a fan interface JK1, a diode D3, a fuse F2, a resistor R14, a resistor R15, and a transistor Q3. The first pin of the second wiring interface J2 is connected to a twenty seventh pin of the third chip U30. A second pin of the fan interface JK1, a positive electrode of the diode D3, and an end of the capacitor C15 are all grounded. A first pin of the fan interface JK1 and a negative electrode of the diode D3 are both connected to a collector of the transistor Q3, the other end of the capacitor C15, an end of the fuse F2, and an end of the resistor R14 are all connected to the output end of the power source module. The other end of the resistor R14 and an end of the resistor R15 are both connected to a base of the transistor Q3. The other end of the fuse F2 is connected to an emitter of transistor Q3, the other end of the resistor R15 is connected to the fifth pin of the first wiring interface J1.

The temperature detection module includes a temperature sensor interface JK2, a resistor R25, a resistor R26, and a capacitor C25. An end of the resistor R25 and an end of the resistor R26 are both connected to a first pin of the temperature sensor interface JK2, the other end of the resistor R25 is connected to the output end of the power source module, the other end of the resistor R26 and an end of the capacitor C25 are both connected to an eighteenth pin of the third chip U30, the other end of the capacitor C25 and a second pin of temperature sensor interface JK2 are both grounded.

Figure 9:
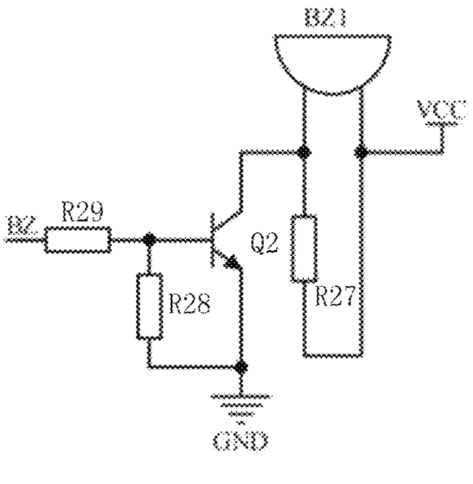
FIG. 9 is a circuit schematic diagram of a buzzer module on the main control circuit board of the present disclosure.

As shown in FIG. 9, the main control circuit board 30 further includes a buzzer module. The buzzer module includes a buzzer BZ1, a resistor R27, a resistor R28, a resistor R29, and a transistor Q2. A base of the transistor Q2 is connected to a twenty second pin of the third chip U30 through the resistor R29. An end of the resistor R28 is connected to a base of the transistor Q2, the other end thereof and an emitter of the transistor Q2 are grounded A collector of the transistor Q2 and an end of the resistor R27 are connected to an end of the buzzer BZ1, the other end of the resistor R27 and the other end of the buzzer BZ1 are both connected to the output end of the power source module 301. The buzzer produces a prompt sound when the power source button, the pressure gear button, and the remote control gear button are operated.

Figure 10:
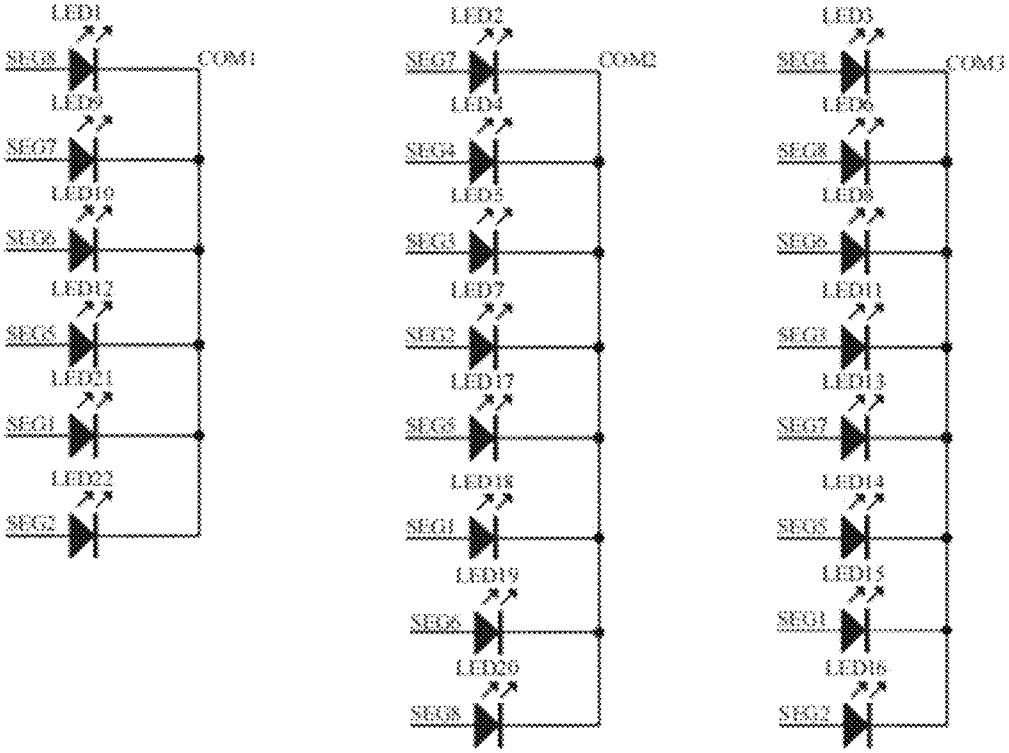
FIG. 10 is a circuit schematic diagram of an indicator light drive module on the main control circuit board of the present disclosure.

As shown in FIG. 10, the main control circuit board 30 further includes an indicator light drive module, including LED1-LED22, which is driven by the third chip U30. Where, negative electrode ends of LED1, LED9, LED10, LED12, LED21, and LED22 are all connected to a tenth pin of the third chip U30, and positive electrode ends are respectively connected to fourteenth, thirteenth, twentieth, sixth, and seventh pins of the third chip U30; negative electrode ends of LED2, LED4, LED5, LED7, LED17, LED18, LED19, and LED20 are all connected to a twenty pin of the third chip U30, while the positive electrode ends are respectively connected to a thirtieth, nineth, eighth, seventh, eleventh, sixth, twelfth, and fourteenth pins of the third chip U30; the negative electrode ends of LED3, LED6, LED8, LED11, LED13, LED14, LED15, and LED16 are all connected to a twentieth pin of the third chip U30, while the positive electrode ends are respectively connected to a nineth, fourteenth, twelfth, eighth, thirteenth, eleventh, sixth, and seventh pins of the third chip U30.

Where, LED21 and LED22 are power indicator lights; LED2, LED9, LED10, LED12, and LED13 are display the indicator lights for the pressure increase button A12, the pressure decrease button A13, the minimum pressure gear button A14, the medium pressure gear button A15, and the maximum pressure gear button A16, respectively, used for indicating the gear selection switch; LED1, LED3, LED4, LED5, LED6, LED7, LED8, LED11, LED14, LED15, LED16, LED17, LED18, LED19, and LED20 are pressure gear indicator lights used to indicate the working level of the cleaning machine.

The present disclosure applies specific examples to explain the principles and implementation modes of the present disclosure. The above examples are only used to help understand the methods and core ideas of the present disclosure; meanwhile, for technical personnel in this field, there may be changes in the specific implementation modes and application scope based on the concept of the present disclosure. In summary, the content of this specification should not be understood as a limitation on the present disclosure.

What is claimed is:

1. An adjustable pressure cleaning machine, comprising a host machine and a water gun, the host machine is provided with a main control circuit board, the water gun is provided with a remote controller, the main control circuit board is connected to the remote controller through communication;

an outer shell of the host machine is provided with a pressure gear button and a power source button, the remote controller is provided with a remote control gear button; the main control circuit board comprises a power source module, a button control module, and a voltage control module; the power source module is connected to an external power supply to provide a working voltage to the button control module and the voltage control module; an output end of the voltage control module is connected to a power input end of a motor of the cleaning machine; wherein the button control module is configured to drive the voltage control module to change an input voltage of the motor according to an operation instruction of the pressure gear button or the remote control gear button, thereby adjusting a water outlet pressure of the water gun;

wherein the power source module comprises a first variable resistor (RV1), a first safety capacitor (CX1), a rectification-and-filtering unit, a switching power supply AC-DC voltage reduction unit, a first transformer (T1), a second safety capacitor (CY1), and a DC-DC voltage reduction unit;

the rectification-and-filtering unit comprises a first rectification bridge (BD1), a fourth capacitor (C4), and a first inductor (L1); the switching power supply AC-DC voltage reduction unit comprises a second capacitor (C2), a third capacitor (C3), a sixth resistor (R6), a first diode (D1), a first chip (U1), a first resistor (R1), an eleventh capacitor (C11), a tenth capacitor (C10), a tenth resistor (R10), a sixth capacitor (C6), and a second diode (D2); the DC-DC voltage reduction unit comprises a fifth diode (D5), a fifth capacitor (C5), a ninth capacitor (C9), a twelfth resistor (R12), a second chip (U2), and a twelfth capacitor (C12);

the first variable resistor (RV1) and the first safety capacitor (CX1) are both connected in parallel between a first input end and a second input end of the first rectification bridge (BD1); the first input end and the second input end of the first rectification bridge (BD1) are respectively connected to a positive electrode and a negative electrode of the external power supply; the fourth capacitor (C4) is connected in parallel between a first output end and a second output end of the first rectification bridge (BD1); one end of the first inductor (L1) is connected to the first output end of the first rectification bridge (BD1); the other end of the first inductor (L1), one end of the second capacitor (C2), two ends of the sixth resistor (R6), two ends of the third capacitor (C3), a negative electrode of the first diode (D1), one end of the first resistor (R1), and one end of the second safety capacitor (CY1) are all connected to a first input end of the first transformer (T1); the second output end of the first rectification bridge (BD1), the other end of the second capacitor (C2) and a fifth pin of the first chip (U1) are all grounded; a positive electrode of the first diode (D1) and an eighth pin of the first chip (U1) are both connected to a second input end of the first transformer (T1); the other end of the first resistor (R1) is connected to a first pin of the first chip (U1); the first pin of the first chip (U1) is grounded through the eleventh capacitor (C11); a third pin of the first chip (U1) is grounded through the sixth capacitor (C6); a fourth pin of the first chip (U1) is grounded through the tenth capacitor (C10); two ends of the tenth resistor (R10) are connected in parallel with two ends of the tenth capacitor (C10); a negative electrode of the second diode (D2) is connected to the third pin of the first chip (U1); a positive electrode of the second diode (D2) is connected to a fourth input end of the first transformer (T1), a third input end of the first transformer (T1) is grounded, the other end of the second safety capacitor (CY1) is connected to a first output end of the first transformer (T1), a positive electrode of the fifth diode (D5) is connected to a second output end of the first transformer (T1); a negative electrode of the fifth diode (D5) is connected to one end of the fifth capacitor (C5), one end of the ninth capacitor (C9), a CON pin of the second chip (U2) and one end of the twelfth capacitor (C12); a connection node is an output end of the power source module; the other end of the fifth capacitor (C5), the other end of the ninth capacitor (C9), and one end of the twelfth resistor (R12) are all connected to the first output end of the first transformer (T1); the other end of the twelfth resistor (R12) is connected to a Vin pin of the second chip (U2); an Out pin of the second chip (U2) and the other end of the twelfth capacitor (C12) are both grounded.

2. The adjustable pressure cleaning machine according to claim 1, wherein the water outlet pressure of the water gun has several levels, the pressure gear button comprises a pressure increase button and a pressure decrease button; for each operation of the pressure increase button or the pressure decrease button, the button control module drives the voltage control module to correspondingly increase or decrease the input voltage of the motor based on the operation instruction of the pressure increase button or the pressure decrease button, thereby increasing or decreasing the water outlet pressure level of the water gun by one level accordingly.

3. The adjustable pressure cleaning machine according to claim 2, wherein the pressure gear button and the remote control gear button both comprise a maximum pressure gear button, a medium pressure gear button, and a minimum pressure gear button; the button control module drives the voltage control module to adjust the input voltage of the motor to a maximum voltage, a medium voltage, or a minimum voltage according to the operation instruction of the maximum pressure gear button, the medium pressure gear button, or the minimum pressure gear button so that the water outlet pressure of the water gun is adjusted to a maximum pressure level, a medium pressure level, and a minimum pressure level accordingly.

4. The adjustable pressure cleaning machine according to claim 1, wherein the button control module comprises a third chip (U30), the fifth capacitor (C5), an eighteenth resistor (R18), a nineteenth resistor (R19), a twenty-first resistor (R21), a twenty-second resistor (R22), a twenty-third resistor (R23), and a twenty-fourth resistor (R24);

a fifteenth pin of the third chip (U30) is connected to the power source button through the twenty-third resistor (R23), a third pin of the third chip (U30) is connected to the pressure increase button through the nineteenth resistor (R19), a first pin of the third chip (U30) is connected to the pressure decrease button through the twenty-first resistor (R21), a second pin of the third chip (U30) is connected to the maximum pressure gear button through the twenty-fourth resistor (R24), a sixteenth pin of the third chip (U30) is connected to the medium pressure gear button through the twenty-second resistor (R22), a fourth pin of the third chip (U30) is connected to the minimum pressure gear button through the eighteenth resistor (R18), a sixteenth capacitor (C16) is connected between a twenty-fourth pin and a twenty-first pin of the third chip (U30), the twenty-fourth pin of the third chip (U30) is connected to the output end of the power source module, the twenty-first pin of the third chip (U30) is grounded.

5. The adjustable pressure cleaning machine according to claim 4, wherein the main control circuit board further comprises a drive signal output module, the button control module is connected to the voltage control module through the drive signal output module;

the drive signal output module comprises a second wiring interface (J2), a sixteenth resistor (R16), a seventeenth resistor (R17), a twenty-first capacitor (C21), a twenty-second capacitor (C22), a twenty-third capacitor (C23), a twenty-fourth capacitor (C24), and a second inductor (L2);

a fifth pin of the second wiring interface (J2) is connected to a nineteenth pin of the third chip (U30) through the sixteenth resistor (R16); one end of the seventeenth resistor (R17) is connected to the nineteenth pin of the third chip (U30), the other end of the seventeenth resistor (R17) is connected to the output end of the power source module; two ends of the twenty-third capacitor (C23) and the twenty-fourth capacitor (C24) are connected in parallel between a fourth pin and a third pin of the second wiring interface (J2); one end of the second inductor (L2) is connected to a fourth pin of the second wiring interface (J2); the other end of the second inductor (L2), one end of the twenty-first capacitor (C21) and one end of the twenty-second capacitor (C22) are all connected to the output end of the power source module; the third pin of the second wiring interface (J2), the other end of the twenty-first capacitor (C21) and the other end of the twenty-second capacitor (C22) are all grounded, a second pin of the second wiring interface (J2) is connected to a twenty-sixth pin of the third chip (U30).

6. The adjustable pressure cleaning machine according to claim 5, wherein the main control circuit board further comprises a zero-crossing detection module;

the voltage control module comprises a first bidirectional thyristor (M1), a first capacitor (C1), a seventh capacitor (C7), a thirteenth resistor (R13), a fifth resistor (R5), a ninth resistor (R9), a third resistor (R3), a first optocoupler (U5), an eleventh resistor (R11), a twentieth resistor (R20), a first MOS transistor (FET1), a fourteenth capacitor (C14), a first transistor (Q1), a seventh resistor (R7), an eighth resistor (R8), a thirteenth capacitor (C13), and a first wiring interface (J1);

the output end of the voltage control module is connected to a positive electrode power input end of the motor; one end of the first capacitor (C1) is connected to one end of the seventh capacitor (C7) and a first end of the first bidirectional thyristor (M1), and the connection node is the output end of the voltage control module; the other end of the first capacitor (C1) is connected to one end of the thirteenth resistor (R13); the other end of the thirteenth resistor (R13), a second end of the first bidirectional thyristor (M1), one end of the fifth resistor (R5), and one end of the third resistor (R3) are all connected to a positive electrode of the external power supply, the other end of the third resistor (R3) is connected to the zero-crossing detection module, the zero-crossing detection module is further connected to a first pin of the first wiring interface (J1); the other end of the seventh capacitor (C7) is connected to the other end of the fifth resistor (R5) and one end of the ninth resistor (R9); and the end of the ninth resistor (R9) is connected to a third pin of the first optocoupler (U5); a fourth pin of the first optocoupler (U5) is connected to a controlled end of the first bidirectional thyristor (M1); a first pin of the first optocoupler (U5) is connected to a collector of the first transistor (Q1) through the eleventh resistor (R11); a second pin of the first optocoupler (U5) is connected to a drain of the first MOS transistor (FET1); a gate of the first MOS transistor (FET1) is connected to the output end of the power source module through the twentieth resistor (R20); one end of the fourteenth capacitor (C14) is connected to the gate of the first MOS transistor (FET1), the other end of the fourteenth capacitor (C14) and a source of the first MOS transistor (FET1) are both grounded; a base of the first transistor (Q1) is connected to an emitter through the seventh resistor (R7), one end of the eighth resistor (R8) is connected to the base of the first transistor (Q1); the other end of the eighth resistor (R8) and one end of the thirteenth capacitor (C13) are connected to a fourth pin of the first wiring interface (J1); the other end of the thirteenth capacitor (C13) is connected to the output end of the power source module, a second pin of the first wiring interface (J1) is connected to the output end of the power source module, a third pin of the first wiring interface (J1) is grounded, and the first pin of the first wiring interface (J1) is connected to the zero-crossing detection module.

7. The adjustable pressure cleaning machine according to claim 6, wherein the zero-crossing detection module comprises a second optocoupler (U3), a third optocoupler (U4), a second resistor (R2), and a fourth resistor (R4);

a first pin of the second optocoupler (U3), a second pin of the third optocoupler (U4), and a negative electrode power input end of the motor are all connected to the negative electrode of the external power supply; a second pin of the second optocoupler (U3) and a first pin of the third optocoupler (U4) are both connected to the other end of the third resistor (R3); a fourth pin of the second optocoupler (U3), a fourth pin of the third optocoupler (U4), one end of the fourth resistor (R4), one end of the second resistor (R2), and the other end of the second resistor (R2) are connected to the output end of the power source module; a third pin of the second optocoupler (U3) and a third pin of the third optocoupler (U4) are both grounded, the other end of the fourth resistor (R4) is connected to the first pin of the first wiring interface (J1);

the first wiring interface (J1) is connected to the second wiring interface (J2) to achieve a connection of the voltage control module and the button control module; the first pin of the first wiring interface (J1) is connected to the fifth pin of the second wiring interface (J2), the second pin of the first wiring interface (J1) is connected to the fourth pin of the second wiring interface (J2), the third pin of the first wiring interface (J1) is connected to the third pin of the second wiring interface (J2), the fourth pin of the first wiring interface (J1) is connected to the second pin of the second wiring interface (J2), a fifth pin of the first wiring interface (J1) is connected to a first pin of the second wiring interface (J2).

8. The adjustable pressure cleaning machine according to claim 7, wherein the main control circuit board further comprises a fan drive module and a temperature detection module;

the fan drive module comprises a first fan interface (JK1), a third diode (D3), a second fuse (F2), a fourteenth resistor (R14), a fifteenth resistor (R15), and a third transistor (Q3); the first pin of the second wiring interface (J2) is connected to a twenty-seventh pin of the third chip (U30); a second pin of the first fan interface (JK1), a positive electrode of the third diode (D3), and one end of a fifteenth capacitor (C15) are all grounded; a first pin of the first fan interface (JK1) and a negative electrode of the third diode (D3) are both connected to a collector of the third transistor (Q3), the other end of the fifteenth capacitor (C15), one end of the second fuse (F2), and one end of the fourteenth resistor (R14) are all connected to the output end of the power source module; the other end of the fourteenth resistor (R14) and one end of the fifteenth resistor (R15) are both connected to a base of the third transistor (Q3), the other end of the second fuse (F2) is connected to an emitter of the third transistor (Q3), the other end of the fifteenth resistor (R15) is connected to the fifth pin of the first wiring interface (J1);

the temperature detection module comprises a second temperature sensor interface (JK2), a twenty-fifth resistor (R25), a twenty-sixth resistor (R26), and a twenty-fifth capacitor (C25); one end of the twenty-fifth resistor (R25) and one end of the twenty-sixth resistor (R26) are both connected to a first pin of the second temperature sensor interface (JK2), the other end of the twenty-fifth resistor (R25) is connected to the output end of the power source module, the other end of the twenty-sixth resistor (R26) and one end of the twenty-fifth capacitor (C25) are both connected to an eighteenth pin of the third chip (U30), the other end of the twenty-fifth capacitor (C25) and a second pin of the second temperature sensor interface (JK2) are both grounded.

9. The adjustable pressure cleaning machine according to claim 4, wherein the main control circuit board further comprises a buzzer module;

the buzzer module comprises a first buzzer (BZ1), a twenty-seventh resistor (R27), a twenty-eighth resistor (R28), a twenty-ninth resistor (R29), and a second transistor (Q2); a base of the second transistor (Q2) is connected to a twenty-second pin of the third chip (U30) through the twenty-ninth resistor (R29); an end of the twenty-eighth resistor (R28) is connected to the base of the second transistor (Q2), the other end thereof and an emitter of the second transistor (Q2) are grounded, a collector of the second transistor (Q2) and one end of the twenty-seventh resistor (R27) are connected to one end of the first buzzer (BZ1), the other end of the twenty-seventh resistor (R27) and the other end of the first buzzer (BZ1) are both connected to the output end of the power source module; wherein the first buzzer (BZ1) produces a prompt sound when the power source button, the pressure gear button and the remote control gear button are operated;

the outer shell is further provided with a power indicator light, a button indicator light, and a pressure gear indicator light that are all connected to the button control module.

* * * * *